US010662007B2

(12) United States Patent
Yuvaraj et al.

(10) Patent No.: US 10,662,007 B2
(45) Date of Patent: May 26, 2020

(54) 3D-2D VISION SYSTEM FOR ROBOTIC CARTON UNLOADING

(71) Applicant: Intelligrated Headquarters, LLC, Mason, OH (US)

(72) Inventors: Karthikeyan Yuvaraj, St. Louis, MO (US); Sriram Pavan Tankasala, St. Louis, MO (US); Benjamin E. Nilson, St. Louis, MO (US); Feng Zhang, St. Louis, MO (US); Matthew R. Wicks, St. Charles, MO (US)

(73) Assignee: INTELLIGRATED HEADQUARTERS, LLC, Mason, OH (US)

(*) Notice: Subject to any disclaimer, the term of this patent is extended or adjusted under 35 U.S.C. 154(b) by 0 days.

(21) Appl. No.: 16/386,952

(22) Filed: Apr. 17, 2019

(65) Prior Publication Data

US 2019/0352110 A1 Nov. 21, 2019

Related U.S. Application Data

(63) Continuation of application No. 15/481,969, filed on Apr. 7, 2017, now Pat. No. 10,315,866.

(Continued)

(51) Int. Cl.
*B25J 5/00* (2006.01)
*B65G 67/02* (2006.01)
(Continued)

(52) U.S. Cl.
CPC ............ *B65G 67/02* (2013.01); *B25J 5/00* (2013.01); *B25J 9/0093* (2013.01); *B25J 9/1687* (2013.01);
(Continued)

(58) Field of Classification Search
CPC .. B65G 67/02; B25J 5/00; B25J 9/0093; B25J 9/1687; B25J 9/1697; B25J 15/00; B25J 19/021
See application file for complete search history.

(56) References Cited

U.S. PATENT DOCUMENTS 7,003,136 B1 * 2/2006 Harville ............. G06K 9/00201
348/169
7,896,150 B2 3/2011 Smalley et al.
(Continued)

FOREIGN PATENT DOCUMENTS

CA 2844967 C 2/2016
EP 1205410 A1 5/2002
(Continued)

OTHER PUBLICATIONS

U.S. Appl. No. 15/481,969, filed Apr. 7, 2017, U.S. Pat. No. 10,315,866, Patented.
(Continued)

*Primary Examiner* — Patrick H Mackey
(74) *Attorney, Agent, or Firm* — Alston & Bird LLP

(57) ABSTRACT

Robotic carton loader or unloader incorporates three-dimensional (3D) and two-dimensional (2D) sensors to detect respectively a 3D point cloud and a 2D image of a carton pile within transportation carrier such as a truck trailer or shipping container. Edge detection is performed using the 3D point cloud, discarding segments that are two small to be part of a product such as a carton. Segments that are too large to correspond to a carton are 2D image processed to detect additional edges. Results from 3D and 2D edge detection are converted in a calibrated 3D space of the material carton loader or unloader to perform one of loading or unloading of the transportation carrier. Image processing can also detect jamming of products sequence from indi-
(Continued)

vidually controllable zones of a conveyor of the robotic carton loader or unloader for singulated unloading.

19 Claims, 13 Drawing Sheets

Related U.S. Application Data

(60) Provisional application No. 62/410,435, filed on Oct. 20, 2016, provisional application No. 62/413,122, filed on Oct. 26, 2016, provisional application No. 62/417,368, filed on Nov. 4, 2016.

(51) Int. Cl.
| | |
|---|---|
| *B25J 9/16* | (2006.01) |
| *B25J 15/00* | (2006.01) |
| *B25J 19/02* | (2006.01) |
| *B25J 9/00* | (2006.01) |

(52) U.S. Cl.
CPC ............ *B25J 9/1697* (2013.01); *B25J 15/00* (2013.01); *B25J 19/021* (2013.01)

(56) References Cited

U.S. PATENT DOCUMENTS

| | | | |
|---|---|---|---|
| 8,746,437 B2 | 6/2014 | Schiesser et al. | |
| 9,102,055 B1* | 8/2015 | Konolige | ................ B25J 9/163 |
| 9,205,562 B1* | 12/2015 | Konolige | ............... B25J 9/1687 |
| 9,427,874 B1 | 8/2016 | Rublee | |
| 9,540,172 B2 | 1/2017 | Horn | |
| 9,604,381 B2 | 3/2017 | Michler et al. | |
| 9,912,862 B2* | 3/2018 | Peruch | ................... G06T 17/00 |
| 10,315,866 B2* | 6/2019 | Yuvaraj | .................. B25J 9/0093 |
| 2012/0197439 A1* | 8/2012 | Wang | ..................... B25J 9/1689 |
| | | | 700/259 |
| 2013/0163879 A1* | 6/2013 | Katz | .................... G06K 9/6202 |
| | | | 382/195 |
| 2016/0075031 A1* | 3/2016 | Gotou | ..................... B25J 9/1697 |
| | | | 700/259 |
| 2016/0229061 A1* | 8/2016 | Takizawa | ............... B25J 9/1694 |
| 2016/0288330 A1* | 10/2016 | Konolige | ............. H04N 13/239 |
| 2017/0021502 A1* | 1/2017 | Nusser | .................. B25J 9/1679 |
| 2017/0113352 A1* | 4/2017 | Lutz | ...................... B25J 9/1697 |
| 2018/0111769 A1 | 4/2018 | Yuvaraj et al. | |

FOREIGN PATENT DOCUMENTS

| | | |
|---|---|---|
| JP | 2010-100398 A | 5/2010 |
| WO | 2006/130420 A2 | 12/2006 |
| WO | 2015/153697 A1 | 10/2015 |
| WO | 2015/187975 A1 | 12/2015 |
| WO | 2016/033172 A1 | 3/2016 |

OTHER PUBLICATIONS

European Search Report for Application No. EP 17 19 6946 dated Mar. 28, 2018, 9 pages.
Office Action for U.S. Appl. No. 15/483,151 dated Jan. 17, 2018, 11 pages.

\* cited by examiner

3D-2D VISION SYSTEM FOR ROBOTIC CARTON UNLOADING

PRIORITY CLAIM

This application is a continuation application of and claiming the benefit of priority to U.S. application Ser. No. 15/481,969 entitled "3D-2D VISION SYSTEM FOR ROBOTIC CARTON UNLOADING" filed on Apr. 7, 2017, which is a non-provisional application claiming the benefit of priority to Provisional Application No. 62/410,435 filed on Oct. 20, 2016, Provisional Application No. 62/413,122, filed on Oct. 26, 2016, and Provisional Application No. 62/417,368, filed on Nov. 4, 2016 the entireties of which are incorporated by reference herein.

TECHNICAL FIELD

The present disclosure generally machine vision systems and more particularly to an autonomous vehicle that detects articles using machine vision in a material handling system.

BACKGROUND

Trucks and trailers loaded with cargo and products move across the country to deliver products to commercial loading and unloading docks at stores, warehouses, and distribution centers. Trucks can have a trailer mounted on the truck, or can be of a tractor-semi trailer configuration. To lower overhead costs at retail stores, in-store product counts have been reduced, and products-in-transit now count as part of available store stock. Unloading trucks quickly at the unloading docks of warehouses and regional distribution centers has attained new prominence as a way to refill depleted stock.

Trucks are typically loaded and unloaded with forklifts if the loads are palletized and with manual labor if the products are stacked within the trucks. Unloading large truck shipments manually with human laborers can be physically difficult, and can be costly due to the time and labor involved. In addition, hot or cold conditions within a confined space of a truck trailer or shipping container can be deemed unpleasant work. Consequently, a need exists for an improved unloading system that can unload bulk quantities of stacked cases and cargo from truck trailers more quickly than human laborers and at a reduced cost.

In order to be economical, automation of loading or unloading needs to be relatively fast. Generally-known approaches to unloading cartons quickly have had extremely limited acceptance. It has been proposed to unload trailers without specific knowledge of exact locations of cartons within the trailer by applying bulk handling techniques. For example, the entire trailer can be tipped to move product toward a rear end door. For another example, cartons are placed on fabric layer that is pulled toward the rear end door to dump the contents. In both instances, integrity of packaging and contents of cartons are jeopardized by applying bulk handling techniques. At another extreme, it is known to use an articulated robotic arm with a machine vision sensor on an end effector that scans a scene focused on an area of next position for a pick or put. Extensive imaging processing and 3D point cloud processing occurs in an attempt to detect cartons that are present within in a narrow portion of the carton pile. The wait time between operations makes it difficult to achieve an economical return on investment (ROI) for an automated trailer loader or unloader. Even with extensive detection efforts, failures to detect individual cartons occur due to difficulty to sense edges that are too tightly aligned for 3D detection or otherwise too optically camouflaged for 2D detection.

BRIEF SUMMARY

In one aspect, the present disclosure provides a method of determining locations of individual cartons in a material handling system. In one or more embodiments, the method includes receiving a two-dimensional (2D) image and a three-dimensional (3D) point cloud of at least one portion of a carton pile resting on a floor of a transportation carrier. The method includes detecting segments within the 3D point cloud. The method includes removing any segments that are smaller than a first threshold. The method includes determine whether any segments are less than a second threshold. The method includes, in response to determining that a selected segment is less than the second threshold, qualifying the selected segment as a 3D detected carton. The method includes in response to determining that a selected segment is not less than the second threshold: (i) determining a 2D mask that corresponds to the selected segment; (ii) determining a portion of the 2D image that corresponds to the 2D mask; (iii) detecting segments within the portion of the 2D image; and (iv) qualifying detected segments as 2D detected cartons. The method includes combining the 2D and 3D detected cartons in a detection result. The method includes converting the detection result using calibration information into 3D locations relative to a robotic carton handling system for a selected one of a loading operation and an unloading operation.

In another aspect, the present disclosure provides a robotic carton handling system for unloading cartons in a carton pile. The robotic carton handling system is movable across a floor. In one or more embodiments, the robotic carton handling system includes a mobile body. The robotic carton handling system includes a movable robotic manipulator attached to the mobile body. The movable robotic manipulator includes an end effector at an end thereof. The end effector unloads or loads one or more cartons from the carton pile. A conveyor mounted on the mobile body receives the one or more cartons from the end effector and to move the one or more cartons towards a rear of the robotic carton handling system. A carton detection system includes one or more sensors coupled respectively to one of the mobile body and the movable robotic manipulator. The one or more sensors provide a 2D image and a 3D point cloud of at least one portion of a carton pile resting on a floor of a transportation carrier. A processing subsystem is in communication with the one or more sensors. The processing subsystem detects segments within the 3D point cloud. The processing subsystem removes any segments that are smaller than a first threshold. The processing subsystem determines whether any segments are less than a second threshold. The processing subsystem, in response to determining that a selected segment is less than the second threshold, qualifies the selected segment as a 3D detected carton. The processing subsystem, in response to determining that a selected segment is not less than the second threshold: (i) determines a 2D mask that corresponds to the selected segment; (ii) determines a portion of the 2D image that corresponds to the 2D mask; (iii) detects segments within the portion of the 2D image; and (iv) qualifies detected segments as 2D detected cartons. The processing subsystem combines the 2D and 3D detected cartons in a detection result. The processing subsystem converts the detection result using calibration information into 3D locations relative to a robotic carton handling system for a selected one of a loading operation and an unloading operation.

In an additional aspect, the present disclosure provides a material handling system including a robotic carton handling system for unloading cartons in a carton pile. The robotic carton handling system is movable across a floor. In one or more embodiments, the robotic canon handling system includes a mobile body and a movable robotic manipulator attached to the mobile body. The movable robotic manipulator includes an end effector at an end thereof. The end effector unloads one or more cartons from the carton pile. A conveyor mounted on the mobile body receives the one or more cartons from the end effector and to move the one or more cartons towards a rear of the robotic carton handling system. A carton detection system includes one or more sensors coupled respectively to one of the mobile body and the movable robotic manipulator. The one or more sensors provide a 2D image and a 3D point cloud of at least one portion of a carton pile resting on a floor of a transportation carrier. A processing subsystem is in communication with the one or more sensors. The processing subsystem detects segments within the 3D point cloud. The processing subsystem removes any segments that are smaller than a first threshold. The processing subsystem determines whether any segments are less than a second threshold. The processing subsystem in response to determining that a selected segment is less than the second threshold, qualifies the selected segment as a 3D detected carton. The processing subsystem in response to determining that a selected segment is not less than the second threshold: (i) determines a 2D mask that corresponds to the selected segment; (ii) determines a portion of the 2D image that corresponds to the 2D mask; (iii) detects segments within the portion of the 2D image; and (iv) qualifies detected segments as 2D detected cartons. The processing subsystem combines the 2D and 3D detected cartons in a detection result. The processing subsystem converts the detection result using calibration information into 3D locations relative to a robotic carton handling system for a selected one of a loading operation and an unloading operation. An automation controller is in communication with the processing subsystem. The automation controller causes the robotic carton manipulator to perform the selected one of the loading operation and the unloading operation by the robotic carton handling system using the 3D locations. An extendable conveyor system has a proximal end coupled to a stationary conveyor system. The extendable conveyor has a movable distal end positioned proximate to the robotic carton handling system to transfer cartons between the stationary conveyor and the robotic carton handling system.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
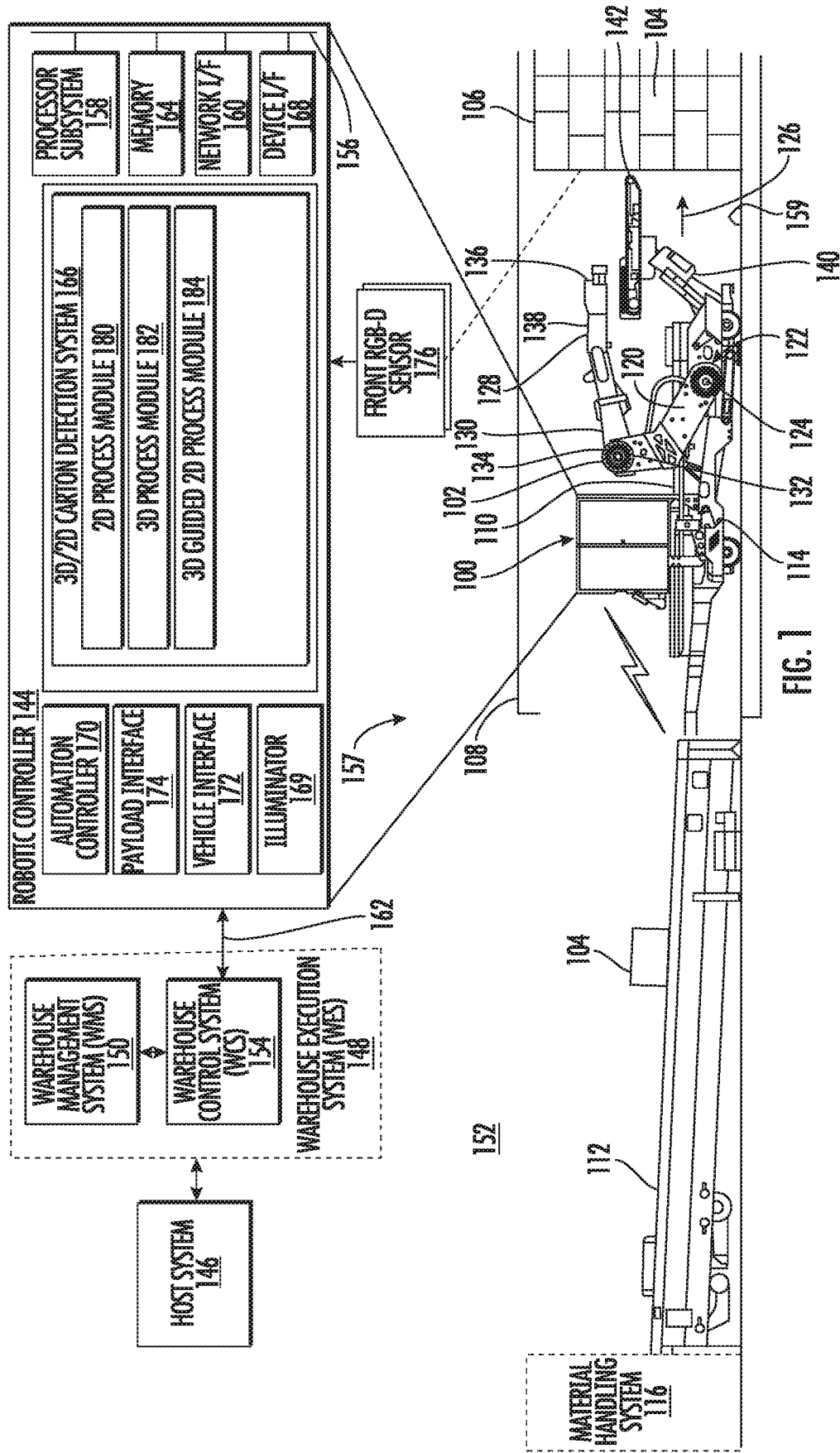
FIG. 1 illustrates a side view with functional block diagram of a robotic carton handling system and extendable conveyor unloading cartons from within a carton pile container using a vision system that is multi-quadrant and combined two-dimensional (2D) and three-dimensional (3D), according to one or more embodiments.

Robotic carton loader or unloader incorporates three-dimensional (3D) and two-dimensional (2D) sensors to detect respectively a 3D point cloud and a 2D image of a carton pile within transportation carrier such as a truck trailer or shipping container. Cartons can be identified in part within the 3D point cloud by discarding segments that are two small to be part of a product such as a carton. Segments that are too large to correspond to a carton are 2D image processed to detect additional edges. Results from 3D and 2D edge detection are converted in a calibrated 3D space of the material carton loader or unloader to perform one of loading or unloading of the transportation carrier.

In one aspect of the present disclosure, a customized Red-Green-Blue and Depth (RGB-D) vision solution is provided for autonomous truck unloaders. A RGB-D sensor system was designed using a combination of industrial Depth and RGB sensor, specifically tailored to the needs of a truck unloader. Four such units combined gives the RGB, depth and RGB-D data across the entire width and height of a trailer. Each of the RGB cameras has unique projection parameters. Using those and the relative position of the Depth and RGB sensor, the 3D from the depth sensor is mapped onto 2D image data from RGB sensor and vice versa. The data from 3D and 2D RGB can be stitched together on the higher level to obtain an entire scene.

After commissioning the product, the lifetime is expected to be long. Average ambient operating temperature, source voltage consistency, shock and vibration isolation, isolation from high power emitters, if controlled properly, will extend the life of the sensors and the system. At the end of life per component, more false positives and false negatives are expected. Dead points can be monitored on the sensor to the point that when a minimum number of points is reached, the sensor can be flagged for replacement. Component pieces are serviceable assuming original parts or compatible replacements can be sourced.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates a robotic carton handling system 100 having a manipulator such as a robotic arm assembly 102 unloads cartons 104 from a carton pile 106 inside of a carton pile container 108, such as a trailer, shipping container, storage unit, etc. Robotic arm assembly 102 places the cartons 104 onto a conveyor system 110 of the robotic carton handling system 100 that conveys the cartons 104 back to an extendable conveyor 112 that follows a mobile body 114 of the robotic carton handling system 100 into the carton pile container 108. The extendable conveyor 112 in turn conveys die cartons 104 to a material handling system 116 such as in a warehouse, store, distribution center, etc.

In one or more embodiments, the robotic carton handling system 100 autonomously unloads a carton pile 106 resting on a floor 118 of the carton pile container 108. The mobile body 114 is self-propelled and movable across the floor 118 from outside to the innermost portion of the carton pile container 108. Right and left lower arms 120 of the robotic arm assembly 102 are pivotally attached at a lower end 122 respectively to the mobile body 114 on opposing lateral sides of the conveyor system 110 passing there between. The right and left lower arms 120 rotate about a lower arm axis 124 that is perpendicular to a longitudinal axis 126 of the conveyor system 110. An upper arm assembly 128 of the robotic arm assembly 102 has a rear end 130 pivotally attached at an upper end 132 respectively of the right and left lower arms 120 to pivotally rotate about an upper arm axis 134 that is perpendicular to the longitudinal axis 126 of the conveyor system 110 and parallel to the lower arm axis 124. A manipulator head 136 is attached to a front end 138 of the upper arm assembly 128 and engages at least one carton 104 at a time from the carton pile 106 resting on the floor 118 for movement to the conveyor system 110. The pivotal and simultaneous mirrored movement of the right and left lower arms 120 maintains the upper arm axis 134 at a relative height above the conveyor system 110 that enables the at least one carton 104 to be conveyed by the conveyor system 110 without being impeded by the robotic arm assembly 102 as soon as the manipulator head 136 is clear. In one or more embodiments, the robotic carton handling system 100 includes a lift 140 attached between the mobile body 114 and a front portion 142 of the conveyor system 110. The lift 140 moves the front portion 142 of the conveyor system 110 relative to the floor 118 to reduce spacing underneath the at least one carton 104 during movement from the carton pile 106 to the conveyor system 110.

A higher level system can assign an autonomous robotic vehicle controller 144 of the robotic carton handling system 100 to a particular carton pile container 108 and can receive information regarding progress of loading/unloading as well as provide a channel for telecontrol. A human operator could selectively intervene when confronted with an error in loading or unloading. The higher level system can include a host system 146 that handles external order transactions that are to be carried out by the material handling system 116. Alternatively or in addition, a warehouse execution system (WES) 148 can provide vertical integration of a warehouse management system (WMS) 150 that performs order fulfillment, labor management, and inventory tracking for a facility 152 such as a distribution center. WES 148 can include a vertically integrated warehouse control system (WCS) 154 that controls automation that carries out the order fulfillment and inventory movements requested by the WMS 150.

In one or more embodiments, once assigned by the WES 148 or manually enabled, the robotic carton handling system 100 can operate autonomously under control of a robotic vehicle controller 154 in: (i) moving into a carton pile container 108, (ii) performing one of loading or unloading the carton pile container 108, and (iii) moving out of the carton pile container 108. In order to navigate within the carton pile container 108 and to expeditiously handle cartons 104 therein, a carton detection system 166 of the robotic vehicle controller 154 includes sensors 157 attached respectively to one of the mobile body 114 and the movable robotic manipulator (robotic arm assembly 102) to provide a two-dimensional (2D) image and a three-dimensional (3D) point cloud of at least one portion of the carton pile 106 resting on a floor 159 of a carton pile container 108. The carton pile container 108 can be stationery or mobile, such as transportation carriers for highway, railway or shipping on navigable waters.

Controller 144 provides an exemplary environment within which one or more of the described features of the various embodiments of the disclosure can be implemented. A controller 144 can be implemented as a unitary device or distributed processing system. The controller 144 includes functional components that communicate across a system interconnect of one or more conductors or fiber optic fabric that for clarity is depicted as a system bus 156. System bus 156 may include a data bus, address bus, and control bus for communicating data, addresses and control information between any of these coupled units. Functional components of the controller 144 can include a processor subsystem 158 consisting of one or more central processing units (CPUs), digital signal processor/s (DSPs) and processor memory. Processor subsystem 158 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes including control of automation equipment of a material handling system.

In accordance with various aspects of the disclosure, an element, or any portion of an element, or any combination of elements may be implemented with processor subsystem 158 that includes one or more physical devices comprising processors. Non-limiting examples of processors include microprocessors, microcontrollers, digital signal processors (DSPs), field programmable gate arrays (FPGAs), programmable logic devices (PLDs), programmable logic controllers (PLCs), state machines, gated logic, discrete hardware circuits, and other suitable hardware configured to perform the various functionality described throughout this disclosure. One or more processors in the processing system may execute instructions. A processing system that executes instructions to effect a result is a processing system which is configured to perform tasks causing the result, such as by providing instructions to one or more components of the processing system which would cause those components to perform acts which, either on their own or in combination with other acts performed by other components of the processing system would cause the result.

Controller 144 may include a network interface (I/F) device 160 that enables controller 144 to communicate or interface with other devices, services, and components that are located external to controller 144, such as WES 148. These networked devices, services, and components can interface with controller 144 via an external network, such as example network 162, using one or more communication protocols. Network 162 can be a local area network, wide area network, personal area network, and the like, and the connection to and/or between network and controller 144 can be wired or wireless or a combination thereof. For purposes of discussion, network 162 is indicated as a single collective component for simplicity. However, it is appreciated that network 162 can comprise one or more direct connections to other devices as well as a more complex set of interconnections as can exist within a wide area network, such as the Internet or on a private intranet. For example, a programming workstation 1924 can remotely modify programming or parameter settings of controller 144 over the network 162. Various links in the network 162 can wired or wireless. Controller 144 can communicate via a device interface 168 with a number of on-board devices such as lights, indicators, manual controls, etc. Device interface 168 can include wireless links and wired links. For example, the controller 144 can direct the extendable conveyor 112 follow the robotic carton handling system 100 into the carton pile container 108 or to lead the robotic carton handling system 100 out of the carton pile container 108.

Controller 144 can include several distributed subsystems that manage particular functions of the robotic carton handling system 100. An automation controller 170 can receive location and spatial calibration information from the 3D/2D carton detection system 166 and use this data to coordinate movement of the mobile body 114 via a vehicle interface 172 and movement by payload components such as robotic arm assembly 102 and the lift 140 that moves the front portion 142 of the conveyor system 110.

The 3D/2D carton detection system 166 can include depth sensing using binocular principles, lidar principles, radar principles, or sonar principles. To avoid dependency on consistent ambient lighting conditions, an illuminator 169 can provide a consistent or adjustable amount of illumination in one or more spectrum bandwidths such as visual light or infrared. The illumination can be narrowly defined in the visual spectrum enabling filtration of most of the ambient light. Alternatively, the illumination can be outside of the visual range such that the illumination is not distracting to human operators. The 3D/2D carton detection system 166 can receive 2D and 3D sensor data from front RGB-D sensors 176 that view an interior of the carton pile container 108 and the carton pile 106. For these and other purposes, the 3D/2D carton detection system 166 can include various applications or components that perform processes described later in the present application. For example, the 3D/2D carton detection system 166 can include a 2D process module 180, a 3D process module 182, and a 3D-guided 2D process module 184.

System memory 164 can be used by processor subsystem 158 for holding functional components such as data and software such as a 3D/2D carton detection system 166. Software may be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, function block diagram (FBD), ladder diagram (LD), structured text (ST), instruction list (IL), and sequential function chart (SFC) or otherwise. The software may reside on a computer-readable medium.

For clarity, system memory 164 can include both random access memory, which may or may not be volatile, nonvolatile data storage. System memory 164 contain one or more types of computer-readable medium, which can be a non-transitory or transitory. Computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Figure 2:
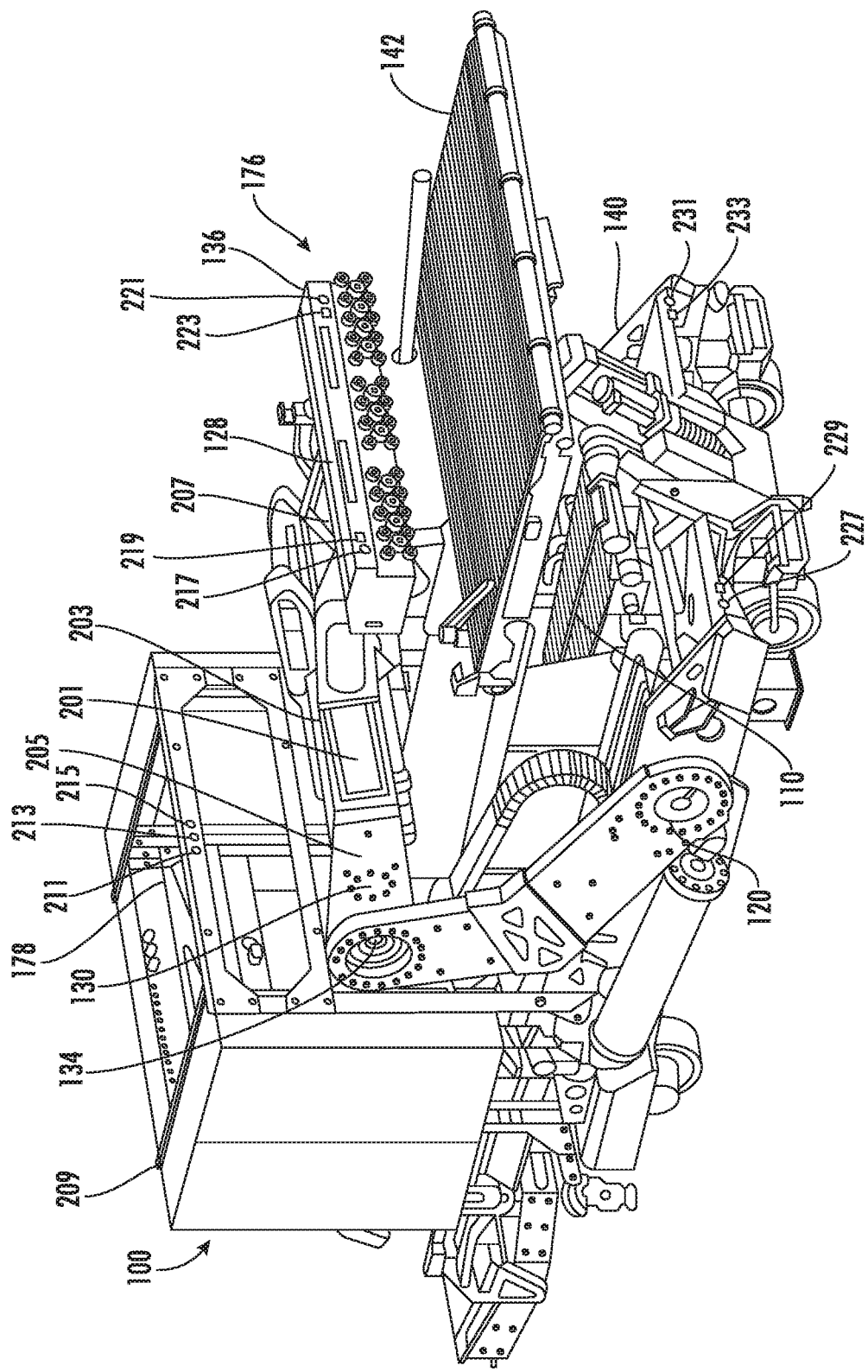
FIG. 2 illustrates a top isometric view of the robotic carton handling system of FIG. 1, according to one or more embodiments.
Figure 3:
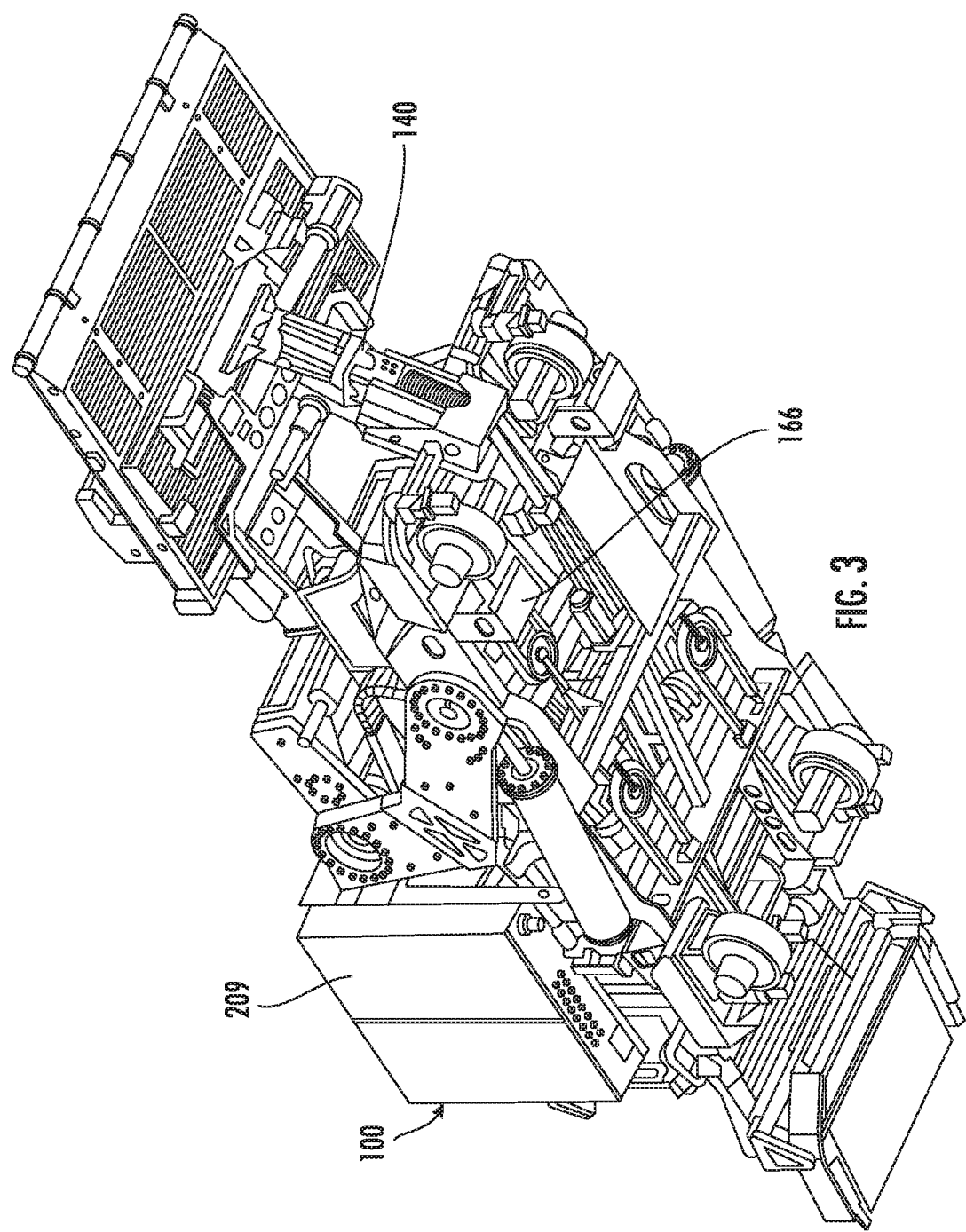
FIG. 3 illustrates a bottom isometric view of the robotic carton handling system of FIG. 1, according to one or more embodiments.

FIG. 2 illustrates that the upper arm assembly 128 of the robotic carton handling system 100 includes a rotatable gantry 201 having the rear end 130 pivotally attached at the upper arm axis 134 to the left and right lower arms 120. The rotatable gantry 201 has a lateral guide 203 at an extended end 205. The upper arm assembly 128 includes an end arm 207 proximally attached for lateral movement to the lateral guide 203 of the rotatable gantry 201 and distally attached to the manipulator head 136. The end arm 207 laterally translates to reach an increased lateral area. Thereby a lighter weight and more maneuverable manipulator head 136 can be employed. FIGS. 2-5 illustrate that an equipment cabinet 209 arches over a back portion of the conveyor system 110. With particular reference to FIG. 5, clearance under the equipment cabinet 209 defines a jam height 210 that can be determined based upon sensor data from rear 3D/2D sensors 178 mounted on the equipment cabinet 209 for any cartons received on the front portion 142 of the conveyor system 110. For example, the rear 3D/2D sensors 178 can include a 2D infrared sensor 211, a 3D depth sensor 213, and a 2D optical sensor 215. Front 3D/2D sensors 176 can include spatially separated sensors that operate in different spectrum and dimensions in order to detect articles such as product, cartons, boxes, cases, totes, etc., (cartons 104) under a number of stacking arrangements, lighting conditions, etc. Mounting sensors on the end effector (manipulator head 136) also allows varying a vantage point, such as looking downward onto the carton pile 106 to better differentiate top-most cartons 104.

Figure 4:
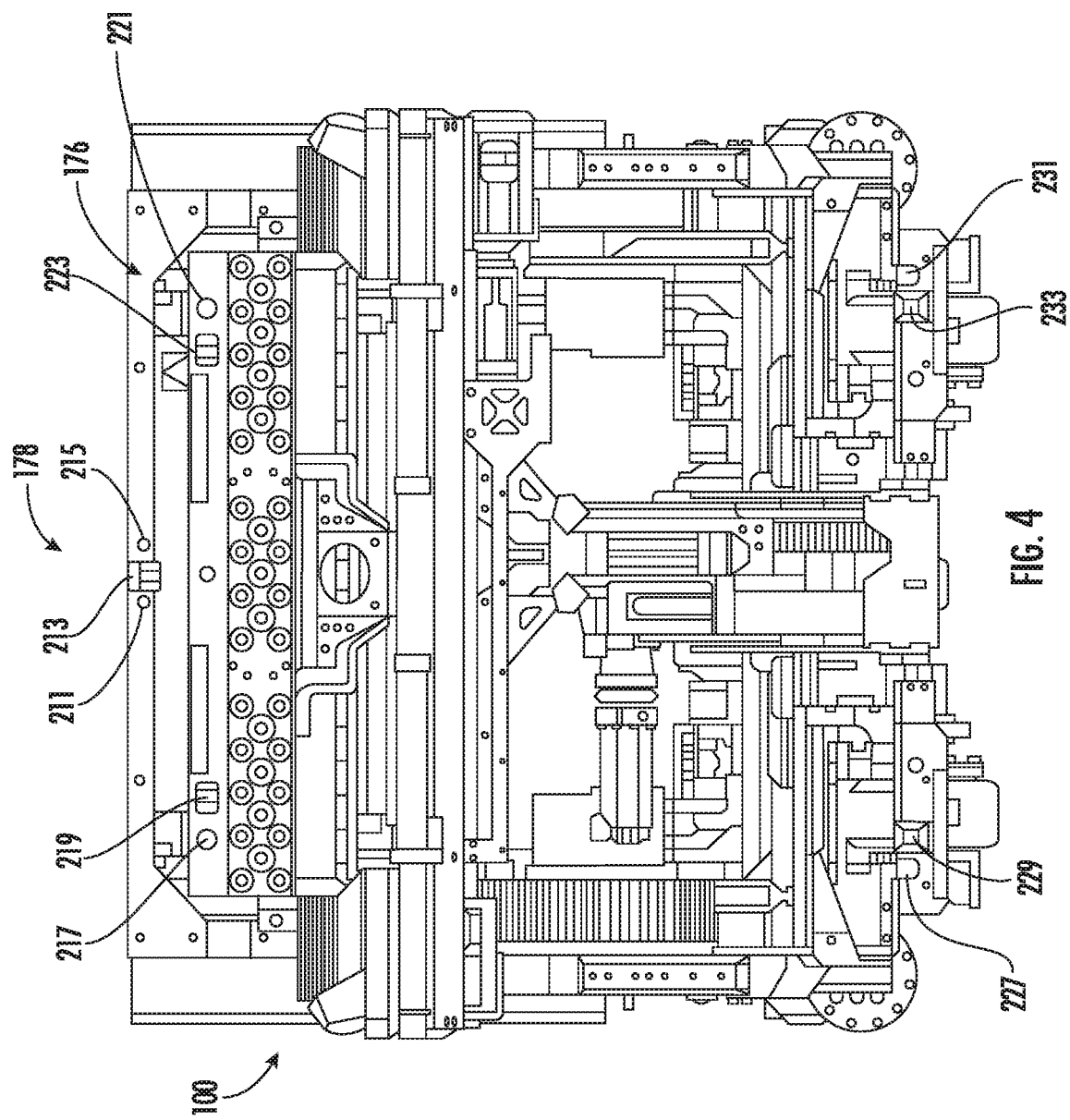
FIG. 4 illustrates a front side view of a forward portion of the robotic carton handling system of FIG. 1, according to one or more embodiments.
Figure 5:
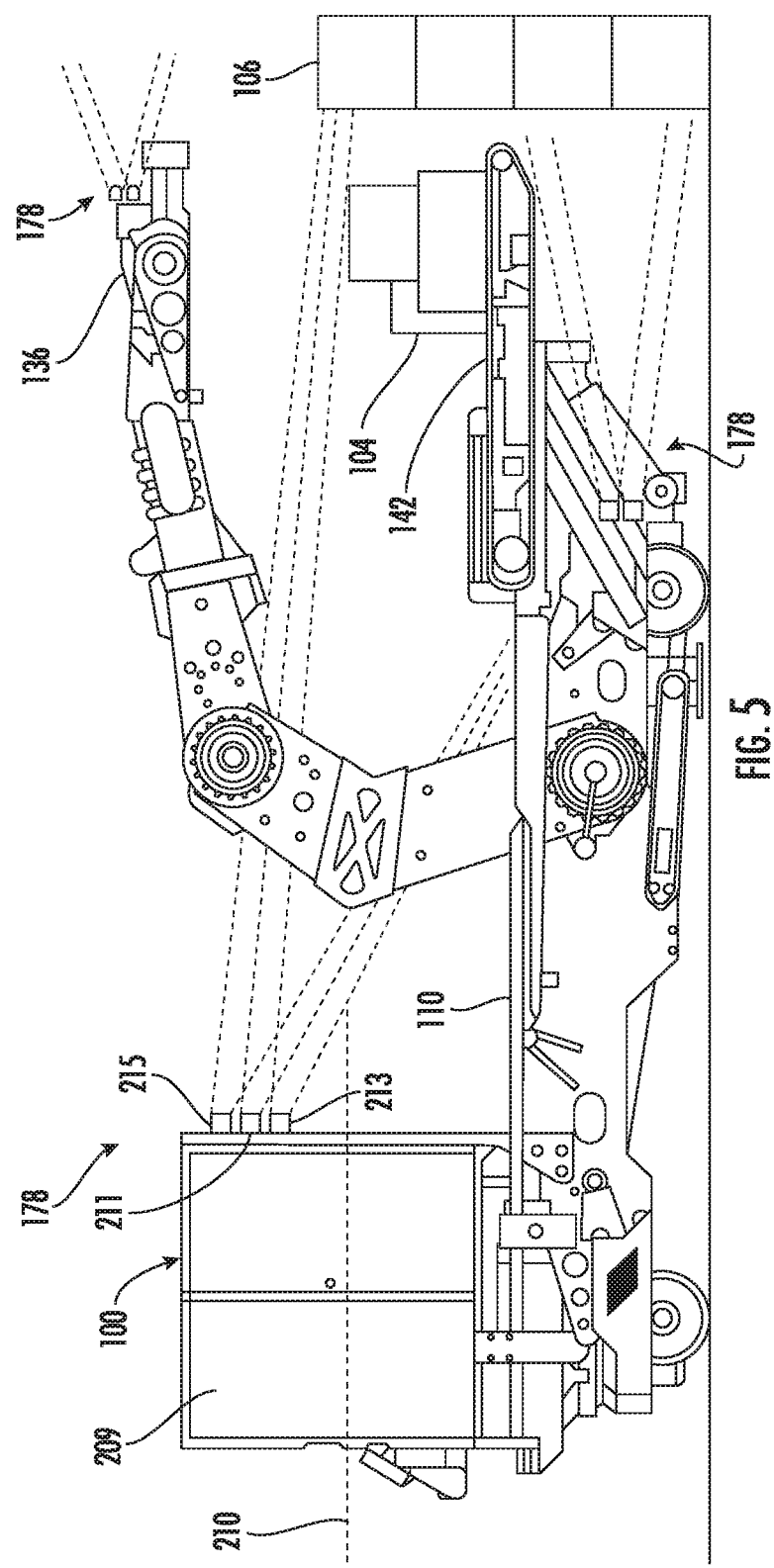
FIG. 5 illustrates a right side view of a forward portion of the robotic carton handling system of FIG. 1, according to one or more embodiments.

With particular reference to FIGS. 2 and 4, in an exemplary embodiment the front 3D/2D sensors 176 include a top left 2D sensor 217, a top left 3D sensor 219, a top right 2D sensor 221, and a top right 3D sensor 223 on the manipulator head 136. The front 3D/2D sensors 176 include bottom left 2D sensor 227, a bottom left 3D sensor 229, a bottom right 2D sensor 231, and a bottom right 3D sensor 233 on the front end of the mobile body 114.

Figure 6:
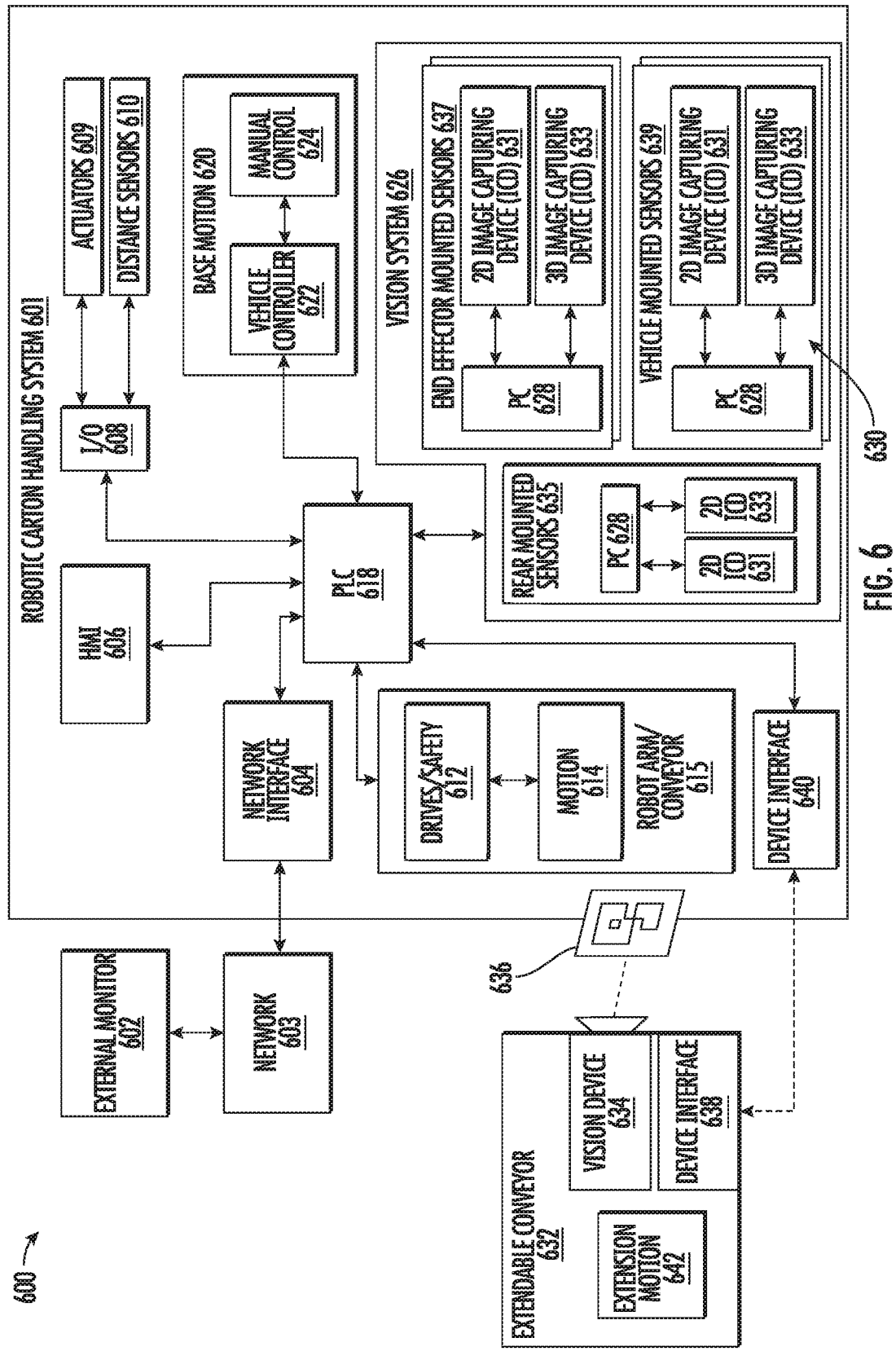
FIG. 6 illustrates an exemplary computing environment for an onboard unloading controller of the robotic carton handling system of FIG. 1, according to one or more embodiments.

FIG. 6 illustrates exemplary components of a material handling system 600 that includes robotic carton handling system 601 suitable for use in various embodiments. The robotic carton handling system 601 may include an external monitor 602, a network interface module 604, an HMI module 606, an input/output module (I/O module 608), a robotic arm and a conveyor system 615 that includes a drives/safety module 612 and a motion module 614, a programmable logic controller (or PLC 618), a base motion module 620 that includes a vehicle controller module 622 and a manual control module 624, and a vision system 626 (or visualization system) that may include one or more personal computing devices 628 (or "PCs") and sensor devices 630. In some embodiments, vision system 626 of the robotic carton handling system 601 may include a PC 628 connected to each sensor device 630. In embodiments in which more than one sensor device 630 is present on the robotic carton handling system 601, the PCs 628 for each sensor device 630 may be networked together and one of the PCs 628 may operate as a master PC 628 receiving data from the other connected PCs 628, may perform data processing on the received data and its own data (e.g., coordinate transformation, duplicate elimination, error checking, etc.), and may output the combined and processed data from all the PCs 628 to the PLC 618. In some embodiments, the network interface module 604 may not have a PLC inline between itself and the PC 628, and the PLC 618 may serve as the Vehicle Controller and/or Drives/Safety system. Sensor devices 630 can include 2D image capturing devices (ICDs) 631 and 3D image capturing devices (ICDs) 633 segregated into sectors for different viewing portions or vantage points. Subsets can include rear mounted sensors 635, end effector mounted sensors 637, and vehicle mounted sensors 639.

The robotic carton handling system 601 may connect to remote locations or systems with the network interface module 604 (e.g., a Wi-Fi™ radio, etc.) via a network 603, such as a local area Wi-Fi™ network. In particular, the network interface module 604 may enable the robotic carton handling system 601 to connect to an external monitor 602. The external monitor 602 may be anyone of a remote warehouse or distribution center control room, a handheld controller, or a computer, and may provide passive remote viewing through the vision system 626 of the robotic carton handling system 601. Alternately, the external monitor 602 may override the programming inherent in the vision system 626 and assume active command and control of the robotic carton handling system 601. Programming for the robotic carton handling system 601 may also be communicated, operated and debugged through external systems, such as the external monitor 602. Examples of an external monitor 602 that assumes command and control may include a remotely located human operator or a remote system, such as a warehouse or distribution server system (i.e., remote device as described above). Exemplary embodiments of using an external monitor 602 to assume command and control of the robotic carton handling system 601 may include human or computer intervention in moving the robotic carton handling system 601, such as from one unloading bay to another, or having the external monitor 602 assume control of the robotic arm to remove an item (e.g., box, carton, etc.) that is difficult to unload with autonomous routines. The external monitor 602 may include any of: a visual monitor, a keyboard, a joystick, an I/O port, a CD reader, a computer, a server, a handheld programming device, or any other device that may be used to perform any part of the above described embodiments.

The robotic carton handling system 601 may include a human machine interface module 606 (or HMI module 606) that may be used to control and/or receive output information for the robot arm and conveyor system 615 and/or the base motion module 620. The HMI module 606 may be used to control (or may itself include) a joystick, a display, and a keypad that may be used for re-programming, over-riding the autonomous control of the machine, and driving the robotic carton handling system 601 from point to point. Actuators 609 may be actuated individually or in any combination by the vision system 626 via the I/O module 608, and distance sensors 610 may be used to assist in guiding the robotic carton handling system 601 into an unloaded area (e.g., a trailer). The I/O module 608 may connect the actuators 609 and distance sensors 610 to the PLC 618. The robotic arm and conveyor system 615 may include all components needed to move the arm and/or the conveyor, such as drives/engines and motion protocols or controls. The base motion module 620 may be the components for moving the entirety of the robotic carton handling system 601. In other words, the base motion module 620 may be the components needed to steer the vehicle into and out of unloading areas.

The PLC 618 that may control the overall electromechanical movements of the robotic carton handling system 601 or control exemplary functions, such as controlling the robotic arm or a conveyor system 615. For example, the PLC 618 may move the manipulator head of the robotic arm into position for obtaining items (e.g., boxes, cartons, etc.) from a wall of items. As another example, the PLC 618 may control the activation, speed, and direction of rotation of kick rollers, and/or various adjustments of a support mechanism configured to move a front-end shelf conveyor, such as front portion 142 of conveyor system 110 (FIG. 1). The PLC 618 and other electronic elements of the vision system 626 may mount in an electronics box (not shown) located under a conveyor, adjacent to a conveyor, or elsewhere on the robotic carton handling system 601. The PLC 618 may operate all or part of the robotic carton handling system 601 autonomously and may receive positional information from the distance sensors (not shown). The I/O module 608 may connect the actuators and the distance sensors 610 to the PLC 618.

The robotic carton handling system 601 may include a vision system 626 that comprises sensor devices 630 (e.g., cameras, 3D sensors, etc.) and one or more computing device 628 (referred to as a personal computer or "PC" 628). The robotic carton handling system 601 may use the sensor devices 630 and the one or more PC 628 of the vision system 626 to scan in front of the robotic carton handling system 601 in real time or near real time. The forward scanning may be triggered by the PLC 618 in response to determining the robotic carton handling system 601, such as a trigger sent in response to the robotic carton handling system 601 being in position to begin detecting cartons in an unloading area. The forward scanning capabilities may be used for collision avoidance, sent to the human shape recognition (safety), sizing unloaded area (e.g., the truck or trailer), and for scanning the floor of the unloaded area for loose items (e.g., cartons, boxes, etc.). The 3D capabilities of the vision system 626 may also provide depth perception, edge recognition, and may create a 3D image of a wall of items (or carton pile). The vision system 626 may operate alone or in concert with the PLC 618 to recognize edges, shapes, and the near/far distances of articles in front of the robotic carton handling system 601. For example the edges and distances of each separate carton in the wall of items may be measured and calculated relative to the robotic carton handling system 601, and vision system 626 may operate alone or in concert with the PLC 618 to may select specific cartons for removal.

In some embodiments, the vision system 626 may provide the PLC with information such as: specific XYZ coordinate locations of cartons targeted for removal from the unloading area, and one or more movement paths for the robotic arm or the mobile body of the robotic carton handling system 601 to travel. The PLC 618 and the vision system 626 may work independently or together such as an iterative move and visual check process for carton visualization, initial homing, and motion accuracy checks. The same process may be used during vehicle movement, or during carton removal as an accuracy check. Alternatively, the PLC 618 may use the move and visualize process as a check to see whether one or more cartons have fallen from the carton pile or repositioned since the last visual check. While various computing devices and/or processors in FIG. 6, such as the PLC 618, vehicle controller module 622, and PC 628, have been described separately, in the various embodiments discussed in relation to FIG. 6 and all the other embodiments described herein, the described computing devices and/or processors may be combined and the operations described herein performed by separate computing devices and/or processors may be performed by less computing devices and/or processors, such as a single computing device or processor with different modules performing the operations described herein. As examples, different processors combined on a single circuit board may perform the operations described herein attributed to different computing devices and/or processors, a single processor running multiple threads/modules may perform operations described herein attributed to different computing devices and/or processors, etc.

An extendable conveyor system 632 can convey articles from the robotic carton handling system 601 to other portions of a material handling system 600. As the robotic carton handling system 601 advances or retreats, a vision device 634 on one or the extendable conveyor system 632 and robotic carton handling system 601 can image a target 636 on the other. Vision system 626 can perform image processing to detect changes in size, orientation and location of the target 636 within the field of view of the vision device 636. Device interfaces 638, 640 respectively of the extendable conveyor system 632 and the robotic carton handling system 601 can convey vision information or movement commands. For example, PLC 618 can command an extension motion actuator 642 on the extendable conveyor system 632 to correspond to movements of the robotic carton handling system 601 to keep the extendable conveyor system 632 and the robotic carton handling system 601 in alignment and in proper spacing. In one embodiment, the device interfaces 638, 640 utilize a short range wireless communication protocol such as a Personal Access Network (PAN) protocol. Examples of PAN protocols which may be used in the various embodiments include Bluetooth®, IEEE 802.15.4, and Zigbee® wireless communication protocols and standards.

Figure 7:
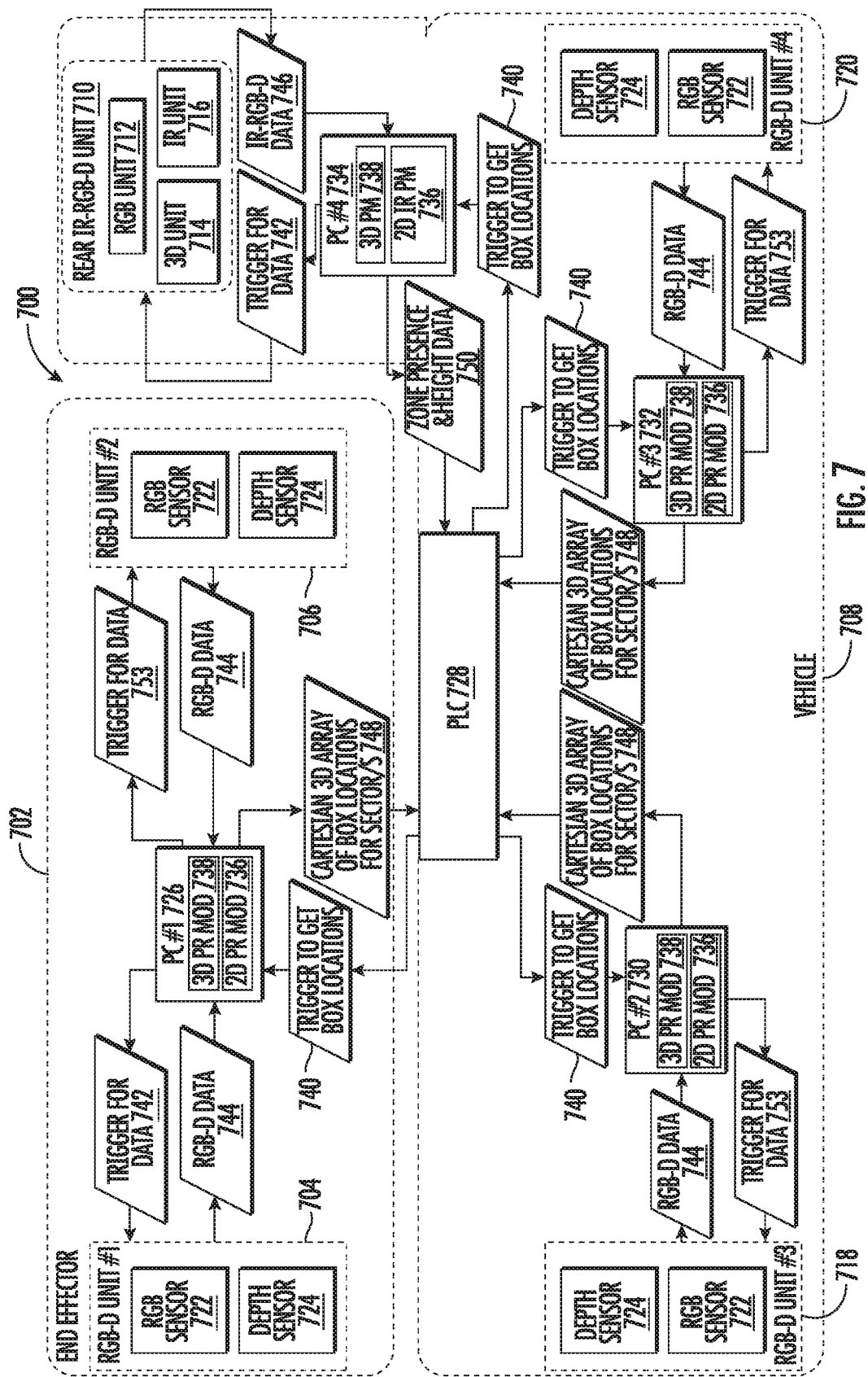
FIG. 7 illustrates a vision system of the robotic carton handling system of FIG. 1, according to one or more embodiments.

FIG. 7 illustrates a data flow within an example vision system 700 of the robotic carton handling system 100 (FIG. 1). An end effector 702 includes a first RGD-D unit 704 and a second RGD-D unit 706. A vehicle 708 includes a rear IR-RGB-D unit 710 positioned for conveyor screening and including an RGB unit 712, a 3D unit 714, and an IR unit 716. The vehicle 708 includes a third RGB-D unit 718 and a fourth RGB-D unit 720, each having an RGB sensor 722 and a depth sensor 724. A first PC 726 is in communication with the first and second RGD-D units 704, 706 and with a PLC 728 that performs automation control of the robotic carton handling system 100 (FIG. 1). A second PC 730 is in communication with the third RGB-D unit 718 and PLC 728. A third PC 732 is in communication with the fourth RGB-D unit 720 and PLC 728. A fourth PC 734 is in communication with the fourth RGB-D unit 720 and PLC 728. The first, second, third and fourth PCs 726, 730, 732, 734 each include 2D process module 736 and a 3D process module 738. PLC 728 sends a trigger signal 740 to each of the first, second, third and fourth PCs 726, 730, 732, 734. Each of the first, second, third and fourth PCs 726, 730, 732, 734 in turn send a trigger signal 742 for data to respective assigned first, second, third and fourth RGB-D units 704, 706, 718, 720 and rear IR-RGB-D unit 710. The first, second, third and fourth RGB-D units 704, 706, 718, 720 respond with RGB-D data 744. The rear IR-RGB-D unit 710 responds with IR-RGB-D data 746. The first, second, and third PCs 726, 730, 732 analyze RGB-D data 744 and provide a Cartesian 3D array 748 of box locations for assigned sectors or quadrants. Fourth PC 734 analyzes the IR-RGB-D data 746 and produces zone presence and height data 752. PLC 728 can consolidate this data or one of the first, second, third and fourth PCs 726, 730, 732, 734 can perform this role for the PLC 728.

Figure 8:
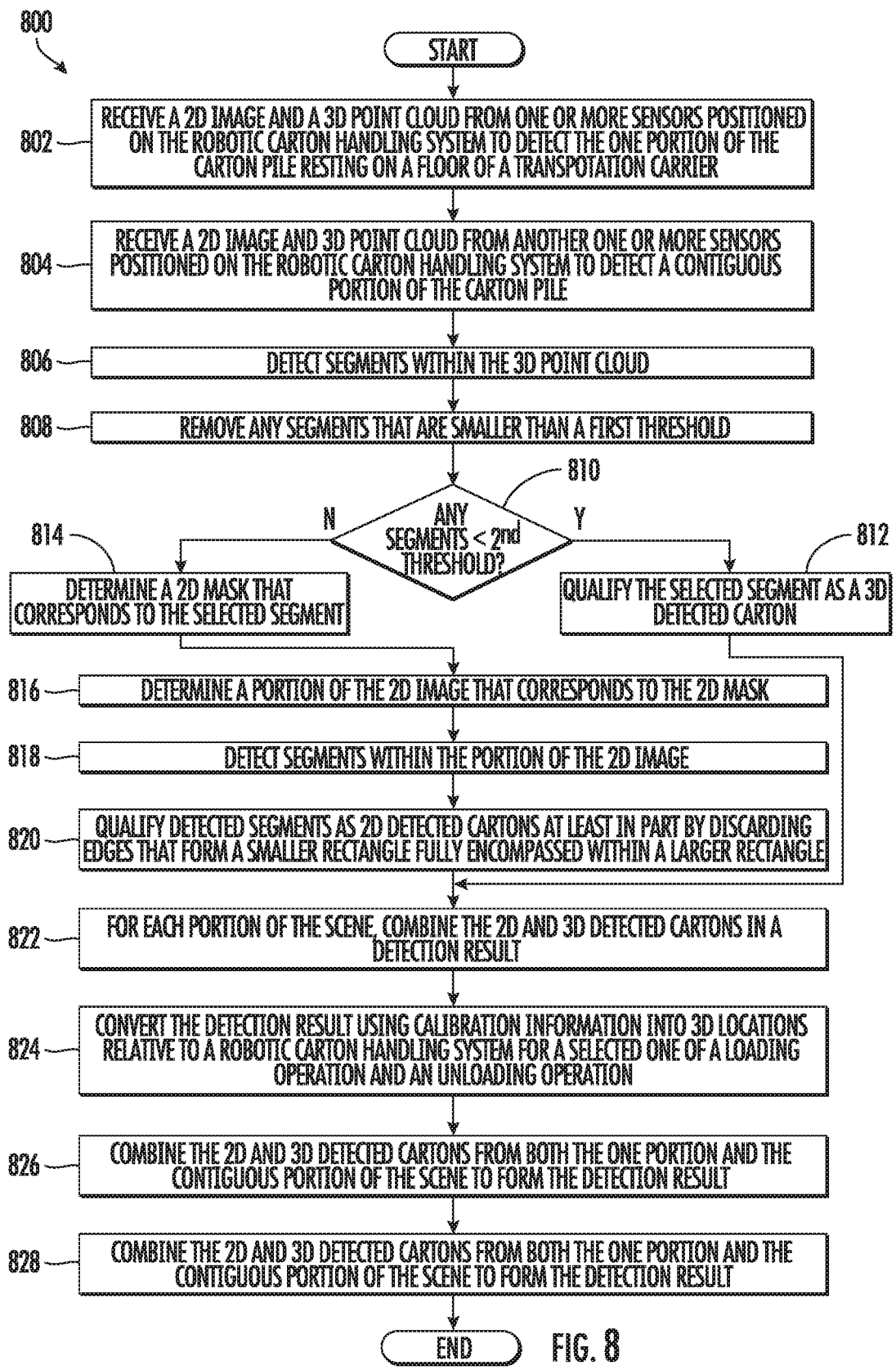
FIG. 8 illustrates a flow diagram of a method for carton detection of a carton pile resting on a floor of a transportation carrier, according to one or more embodiments.

FIG. 8 illustrates a method 800 of determining locations of individual cartons in a material handling system. In one or more embodiment, the method 800 includes receiving a 2D image and a 3D point cloud from one or more sensors positioned on the robotic carton handling system to detect the one portion of the carton pile resting on a floor of a transportation carrier (block 802). Method 800 includes receiving a 2D image and 3D point cloud from another one or more sensors positioned on the robotic carton handling system to detect a contiguous portion of the carton pile (block 804). Method 800 includes detecting segments within the 3D point cloud (block 806). Method 800 includes removing any segments that are smaller than a first threshold (block 808). Method 800 includes determining whether any segments are less than a second threshold that is larger than the first threshold (decision block 810). In response to determining that a selected segment is less than the second threshold in decision block 810, qualifying the selected segment as a 3D detected carton (block 812). Additional rules can be imposed other than a size expected of a carton such as requiring edges to be approximately vertical or horizontal.

In response to determining that a selected segment is not less than the second threshold in decision block 810, method 800 includes:

(i) determining a 2D mask that corresponds to the selected segment (block 814);

(ii) determining a portion of the 2D image that corresponds to the 2D mask (block 816);

(iii) detecting segments within the portion of the 2D image (block 818); and (iv) qualifying detected segments as 2D detected cartons at least in part by discarding edges that form a smaller rectangle fully encompassed within a larger rectangle (block 820).

After 3D detection of block 812 and any 3D guided 2D detection of block 820, method 800 includes combining the 2D and 3D detected cartons in a detection result for each portion of the scene (block 822). Method 800 includes converting the detection result using calibration information into 3D locations relative to a robotic carton handling system for a selected one of a loading operation and an unloading operation (block 824). Method 800 includes combining the 2D and 3D detected cartons from both the one portion and the contiguous portion of the scene to form the detection result (block 826). Method 800 includes performing the selected one of the loading operation and the unloading operation by the robotic carton handling system using the 3D locations (block 828).

Figure 9:
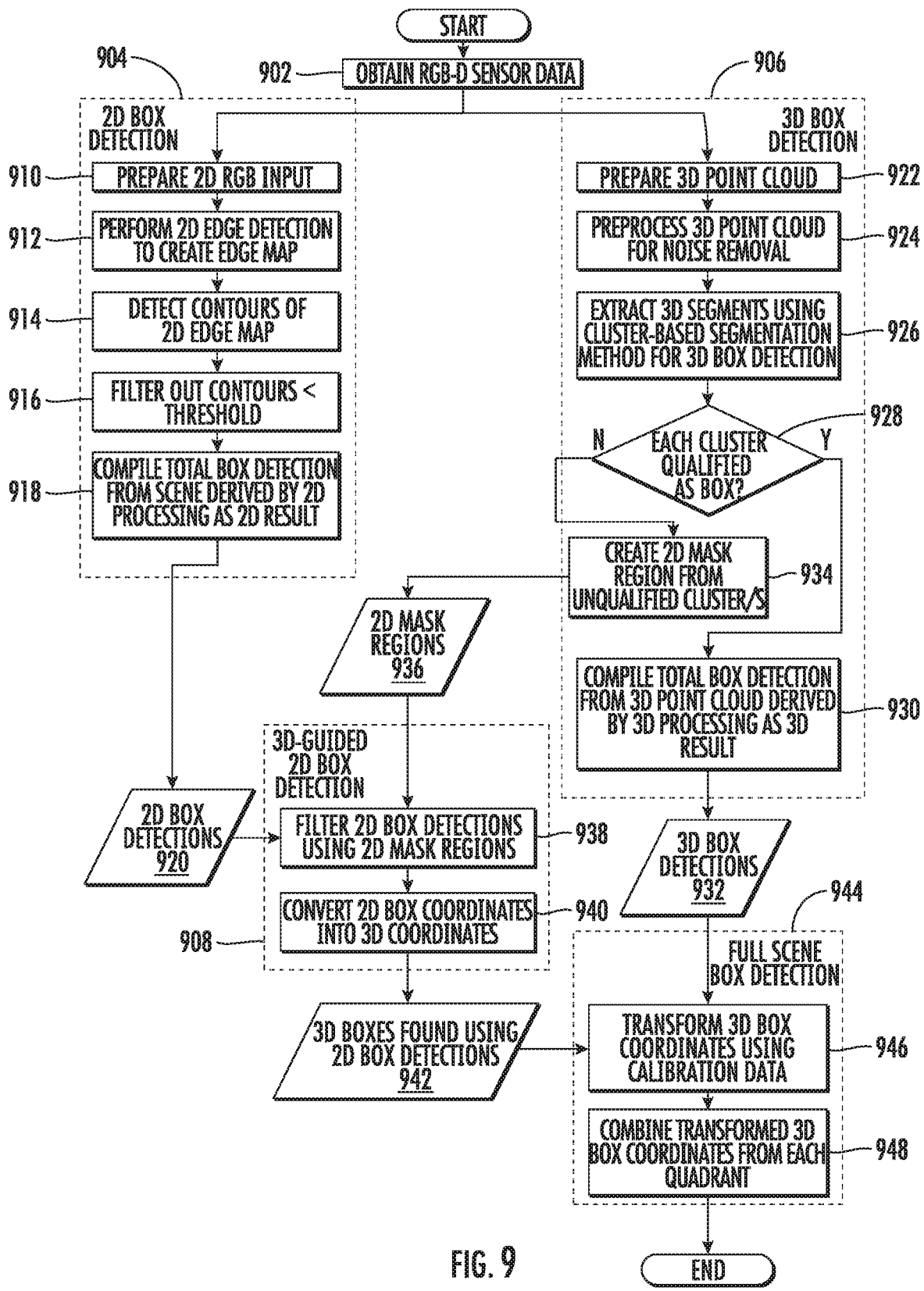
FIG. 9 illustrates flow diagram of a an example method for 2D, 3D, and 3D-guided 2D box detection, according to one or more embodiments.

FIG. 9 illustrates an example method 900 for 2D, 3D, and 3D-guided 2D box detection. According to one or more embodiments, the method 900 includes obtaining optical red-green-blue and depth (RGB-D) sensor data (block 902). Method 900 includes a 2D box detection sub-process 904, a 3D box detection sub-process 906, and a 3D-guided 2D box detection sub-process 908 that analyze the RGB-D sensor data. Each type of detection either singularly or in combination can find edges of cartons, boxes, articles, etc., as well as localizing the robotic carton handling system within a carton pile carrier such as a truck trailer or shipping container.

Beginning with 2D box detection sub-process 904, the method 900 includes preparing 2D RGB input from the RGB-D sensor data (block 910). Method 900 includes performing 2D edge detection to create an edge map (block 912). Method 900 includes detecting contours of the 2D edge map (block 914). Method 900 includes filtering out contours that are less than a threshold (block 916). For example, cartons can have printing or labels that could be deemed to be generally rectangular. Method 900 includes compiling total box detection from scene derived by 2D processing as 2D result (block 918). An output from 2D box detection sub-process 904 is 2D box detection data structure 920.

Continuing with 3D box detection sub-process 906, method 900 includes preparing a 3D point cloud (block 922). Method 900 includes preprocessing 3D point cloud for noise removal (block 924). For example, a resolution level of the 3D point cloud can be reduced to spatially filter and smooth the 3D point cloud. Method 900 includes extracting 3D segments using cluster-based segmentation method for 3D box detection (block 926). Method 900 includes determining whether each cluster qualifies as a box (decision block 928). For example, segments can be filtered for forming rectangles within a certain range of sizes and within a certain range of aspect ratios. In response to determining that certain clusters do qualify as a box in decision block 928, method 900 includes compiling a total box detection from 3D point cloud derived by 3D processing as 3D result (block 930). The 3D box detection sub-process 906 outputs at least in part a 3D box detection data structure 932. In response to determining that a cluster does not qualify as a box in decision block 928, method 900 includes creating a 2D mask region from the unqualified cluster/s (block 934). In which case, the 3D box detection sub-process 906 outputs at least in part a 2D mask region data structure 936.

The 3D-guided 2D box detection sub-process 908 receives the 2D box detection data structure 920 from 2D box detection sub-process 904 and the mask region data structure 932 from the 2D box detection sub-process 906. Method 900 includes filtering 2D box detection data structure 920 using the 2D mask region data structure 932 (block 938). Method 900 includes converting the filtered 2D box coordinates into 3D coordinates (block 940). The 3D-guided 2D box detection sub-process 908 outputs a data structures 942 containing 3D boxes found using 2D box detections.

A full scene box detection sub-process 944 receives the 3D box detection data structure 932 and the data structures 942 containing 3D boxes found using 2D box detections. Method 900 includes transforming 3D box coordinates using calibration data (block 946). In one or more embodiments, distributed processing is performed in order to speed carton detection, to increase resolution and size of an imaged scene, and to improve detection accuracy. The 3D-guided 2D box detection sub-process 908 can consolidate the results from each sector or quadrant of the scene. To this end, method 900 includes combining transformed 3D box coordinates from each quadrant (block 948).

Figure 10:
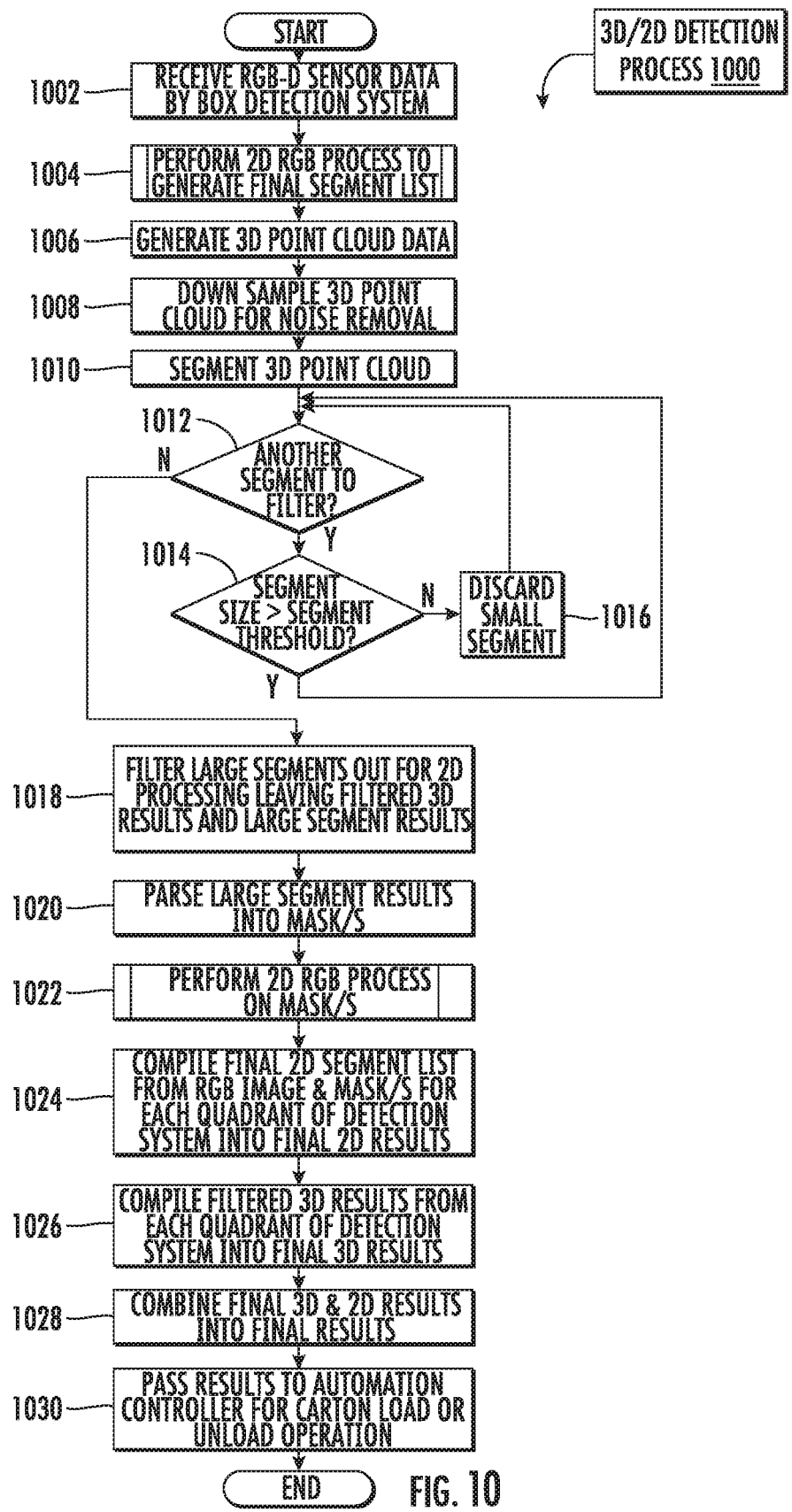
FIG. 10 illustrates flow diagram of a another example method for 2D, 3D, and 3D-guided 2D box detection, according to one or more embodiments.

FIG. 10 illustrates another example method 1000 for 2D, 3D, and 3D-guided 2D box detection. In one or more embodiments, method 1000 includes receiving RGB-D sensor data by a box detection system (block 1002). Method 1000 includes performing 2D RGB process to general final segment list (block 1004), such as described in greater detail in FIG. 12. With continued reference to FIG. 10, method 1000 includes generating 3D point cloud data (block 1006). Method 1000 includes down sampling 3D point cloud data for noise removal (block 1008). Method 1000 includes segmenting the down sampled 3D point cloud data (block 1010). Method 1000 includes determining whether there is another segment to filter (decision block 1012). In response to determining that there is another segment to filter in decision block 1012, method 1000 includes determining whether the selected segment has a size greater than a segment threshold (decision block 1014). In response to determining that the selected segment does not have a size greater than a segment threshold in decision block 1014, method 1000 includes discarding the small segment (block 1016). Method 1000 then returns to decision block 1012. In response to determining that die selected segment does not have a size greater than a segment threshold in decision block 1014, method 1000 returns to decision block 1012. In response to determining that there is not another segment to filter in decision block 1012, method 1000 includes filtering large segments out for 2D processing, leaving filtered 3D results and large segment results (block 1018). Method 1000 includes parsing any large segment results into masks (block 1020). Method 1000 includes performing 2D RGB process on the masks (block 1022). Method 1000 includes compiling final 2D segment list from RGB image and masks for each sector or quadrant of detection system into final 2D results (block 1024). Method 1000 includes compiling filtered 3D results from each sector or quadrant of detection system into final 3D results (block 1026). Method 1000 includes combining final 3D and 2D results into final results (block 1028). Method 1000 includes passing the final results to an automation controller for carton loading or unloading operation (block 1030).

Figure 11:
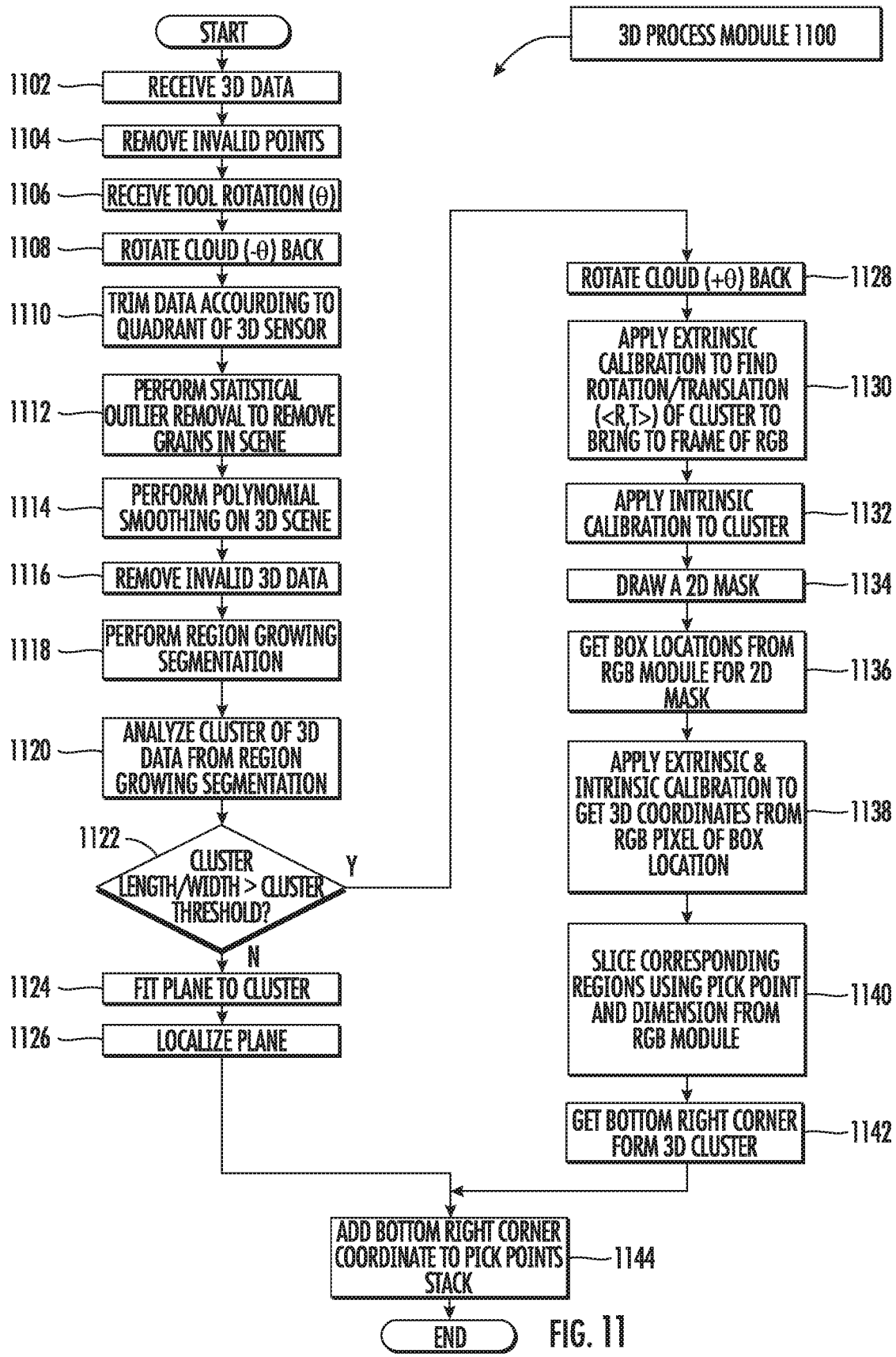
FIG. 11 illustrates flow diagram of a an example method for 3D processing performed as part of the method of FIG. 10, according to one or more embodiments.

FIG. 11 illustrates an example method 1100 for 3D processing performed as part of the method 1000 (FIG. 10). In one or more embodiments, method 1100 includes receiving 3D data (block 1102). Method 1100 includes removing invalid points (block 1104). Method 1100 includes receiving a tool rotation (θ) (block 1106). Method 1100 includes rotating cloud (−θ) back (block 1108). Method 1100 includes trimming data according to quadrant of 3D sensor (block 1110). Method 1100 includes performing statistical outlier removal to remove grains in scene (block 1112). Method 1100 includes performing polynomial smoothing on 3D scene (block 1114). Method 1100 includes removing invalid 3D points (block 1116). Method 1100 includes performing region growing segmentation (block 1118). Method 1100 includes analyzing clusters of 3D data from region growing segmentation (block 1120). Method 1100 includes determining whether cluster length and width are both greater than a cluster threshold (decision block 1122). In response to determining that the cluster length and width are both not greater than a cluster threshold in decision block 1122, method 1100 includes fitting plane to cluster (block 1124). Method 1100 includes localizing plane (block 1126).

In response to determining that the cluster length and width are both greater than a cluster threshold in decision block 1122, method 1100 includes rotating cloud (+θ) back (block 1128). Method 1100 includes applying extrinsic calibration to find rotation and translation (<R, T>) of cluster to bring to frame of RGB (block 1130). Method 1100 includes applying intrinsic calibration to cluster (block 1132). Method 1100 include drawing a 2D mask (block 1134). Method 1100 includes getting box locations from RGB module for 2D mask (block 1136). Method 1100 includes applying extrinsic and intrinsic calibration to get 3D coordinates from RGB pixel of box location (block 1138). Method 1100 includes slicing corresponding regions using pick point and dimension from RGB module (block 1140). Method 1100 includes getting bottom right corner from 3D cluster (block 1142). After localizing plane in block 1126 or after getting bottom right corner from 3D cluster in block 1142, method 1100 includes adding bottom right corner coordinates to pick points stack (block 1144). Method 1100 includes (block 1146).

Figure 12:
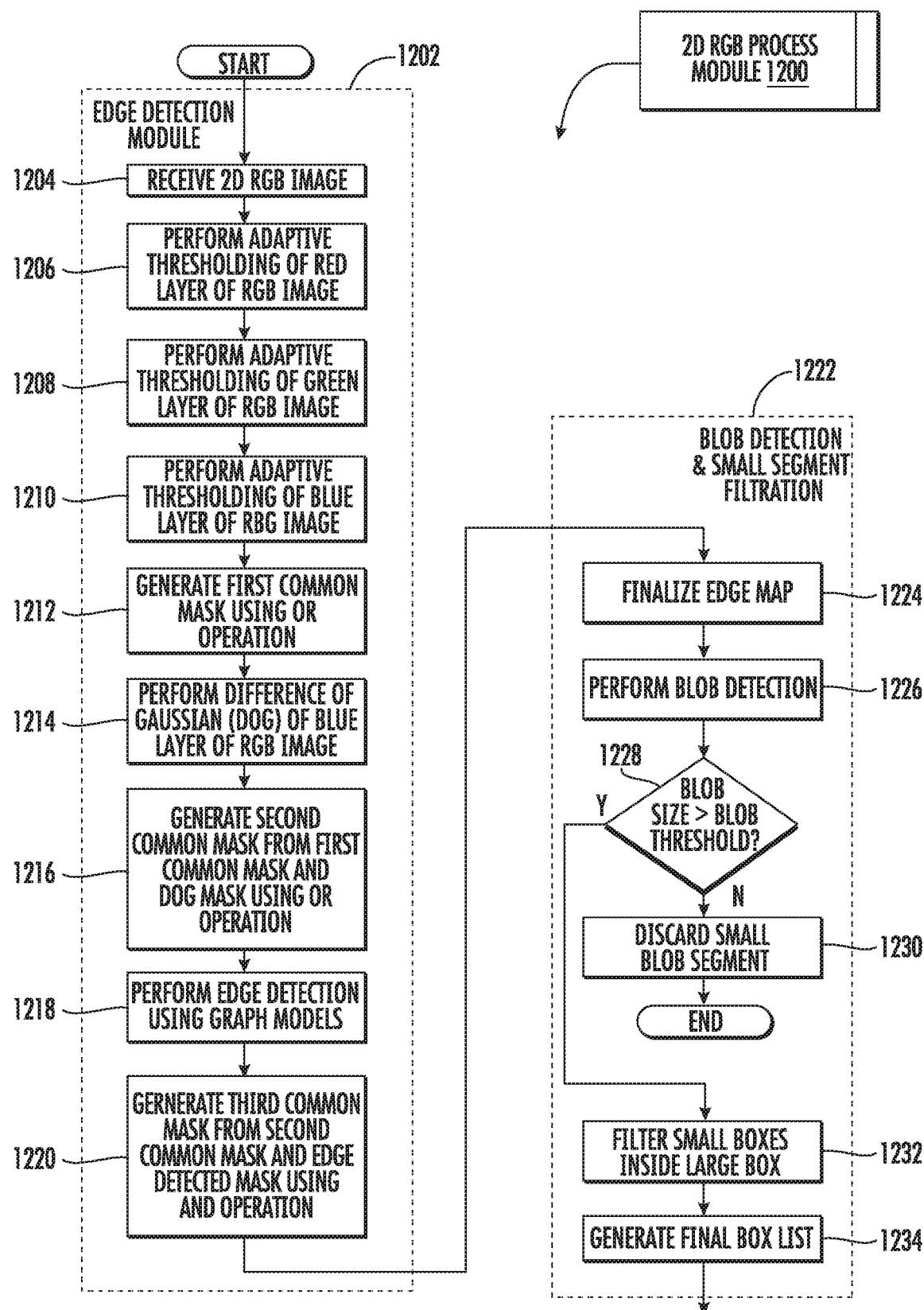
FIG. 12 illustrates flow diagram of a an example method for 2D processing performed as part of the method of FIG. 10, according to one or more embodiments.
Figure 13:
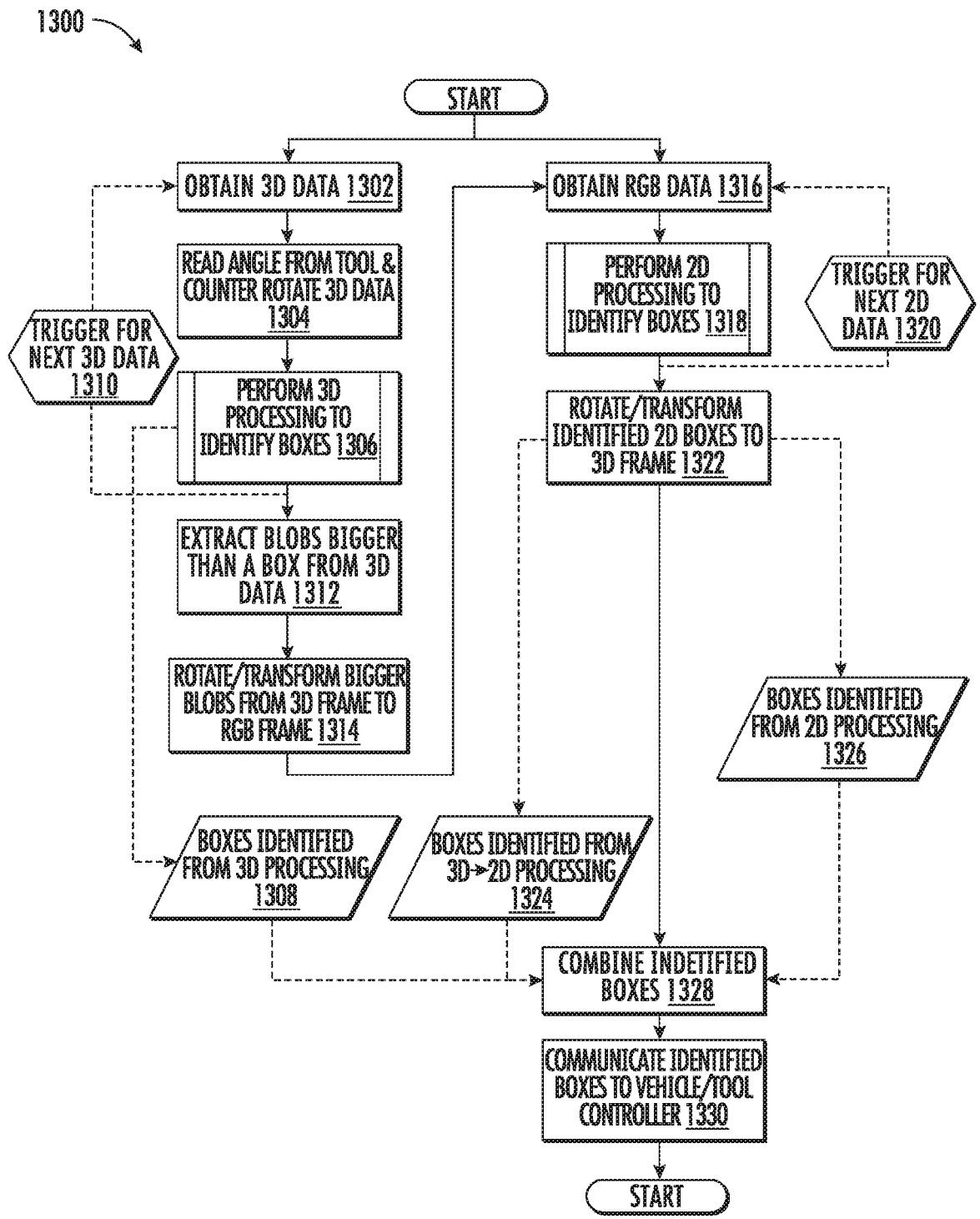
FIG. 13 illustrates a simplified flow diagram of an example method for 2D, 3D, and 3D-guided 2D box detection, according to one or more embodiments.

FIG. 12 illustrates an example method 1200 for 2D processing performed as part of the method 1000 (FIG. 10). Beginning with an edge detection module 1202, method 1200 includes receiving 2D RGB image (block 1204). Method 1200 includes performing adaptive thresholding of red layer of RGB image (block 1206). Method 1200 includes performing adaptive thresholding of green layer of RGB image (block 1208). Method 1200 includes performing adaptive thresholding of blue layer of RGB image (block 1210). Method 1200 includes generating first common mask using OR operation (block 1212). Method 1200 includes perform Difference of Gaussian (DOG) of blue layer of RGB image (block 1214). Method 1200 includes generating second common mask from first common mask and DOG mask using OR operation (block 1216). Method 1200 includes performing edge detection using graph models (block 1218). Method 1200 includes generating a third common mask from second common mask and edge detected mask using AND operation (block 1220). Then in a blob detection and small segment filtration module 1222, method 1200 includes finalizing edge map (block 1224). Method 1200 includes performing blob detection (block 1226). Method 1200 includes determining whether blob size is greater than a blob threshold (decision block 1228). In response to determining that the blob size is not greater than a blob threshold in decision block 1228, method 1200 includes discarding the small blob segment (block 1230). In response to determining that the blob size is greater than a blob threshold in decision block 1228, method 1200 filtering includes small boxes inside a large box (block 1232). Method 1200 includes generating final box list (block 1234).

FIG. 1300 illustrates a method 1300 of combining results of 3D and 2D box detection analysis. A carton detector obtains 3D data (block 1302). The carton detector reads an angle from a tool whose position dictates an angle of a sensor that obtained the 3D data and the carton detector counter rotates the 3D data to a normalized position (block 1304). Method 1300 includes the detector performing 3D processing to identify boxes within the 3D data (block 1306). The result of the detection in block 1306 is any boxes identified from 3D processing (block 1308). The completion of block 1306 can serve as a trigger for a next iteration of 3D data (block 1310). After block 1308, the carton detector extracts blobs that are bigger than a box from the 3D data that require further 2D processing in order to detect boxes (block 1312). The blob of 3D data is rotated and transformed from a 3D frame to an RGB frame (block 1314). Method 1300 then includes obtaining RGB data (block 1316). The source of the RGD data can be directly from a 2D sensor or can be the rotated and transformed 3D data. The detector performs 2D processing to identify boxes (block 1318). The completion of block 1318 can serve as a trigger for a next iteration of 2D data (block 1320). Method 1300 then includes rotating and transforming the identified 2D boxes to the 3D frame (block 1322). The result of the detection in block 1322 can be any boxes identified from 3D augmented 2D processing (block 1324). Alternatively or in addition, the result of the detection in block 1322 can be any boxes identified from 2D processing (block 1326). The identified boxes 1308, 1324, 1326 are combined (block 1328). Method 1300 includes communicated the combined identified boxes to a vehicle/tool controller 1330 to perform one or a loading or an unloading procedure with the benefit of knowing the location of boxes (block 1330). Then method 1300 ends.

As used herein, processors may be any programmable microprocessor, microcomputer or multiple processor chip or chips that can be configured by software instructions (applications) to perform a variety of functions, including the functions of the various embodiments described above. In the various devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The steps of a method or algorithm disclosed herein may be embodied in a processor-executable software module or processor-executable software instructions which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-Ray™ disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

For clarity, the robotic carton handling system 100 (FIG. 1) is described herein as unloading cartons, which can be corrugated boxes, wooden crates, polymer or resin totes, storage containers, etc. The manipulator head can further engage articles that are products that are shrink-wrapped together or a unitary product. In one or more embodiments, aspects of the present innovation can be extended to other types of manipulator heads that are particularly suited to certain types of containers or products. The manipulator head can employ mechanical gripping devices, electrostatic adhesive surfaces, electromagnetic attraction, etc. Aspects of the present innovation can also be employed on a single conventional articulated arm.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method of determining locations of individual cartons in a handling system, the method comprising:
   receiving, by a carton detection system that is positioned on a robotic carton handling system, a two-dimensional (2D) image and a three dimensional (3D) point cloud of at least one portion of a carton pile;
   detecting, by a processing subsystem in connection with the carton detection system, a set of segments within the 3D point cloud;
   detecting, by the processing subsystem in connection with the carton detection system, another set of segments within the 3D point cloud;
   qualifying, by the processing system, the set of segments as 3D detected cartons and the another set of segments as 2D detected cartons;
   combining, by the processing subsystem, the 2D and 3D detected cartons into a detection result; and
   converting, by the processing subsystem, the detection result using calibration information into a 3D location for cartons targeted for removal.

2. The method of claim 1, wherein the set of segments are qualified as the 3D detected cartons if the set of segments are lesser than a segment threshold.

3. The method of claim 1, wherein the another set of segments are qualified as the 2D detected cartons if the another set of segments are greater than a segment threshold.

4. The method of claim 3, wherein when the another set of segments are greater than the segment threshold:
   determining a 2D mask corresponds to the another set of segments;
   determining a portion of the 2D image that corresponds to the 2D mask;
   detecting the another set of segments within the portion of the 2D image; and
   qualifying detected another set of segments as the 2D detected cartons.

5. The method of claim 1, further comprising: receiving the 2D image and 3D point cloud from one or more sensors to detect the at least one portion of the carton pile;
   receiving a 2D image and 3D point cloud from another one or more sensors to detect a contiguous portion of the carton pile; and
   combining the 2D and 3D detected cartons from both the one portion and the contiguous portion to form the detection result.

6. The method of claim 1, wherein qualifying the another set of segments as the 2D detected cartons further comprises discarding, by the processing subsystem, edges that form a smaller rectangle fully encompassed within a larger rectangle.

7. The method of claim 1, further comprising stitching the 2D image and the 3D point cloud together to obtain an image of the carton pile.

8. The method of claim 1, further comprising.
   performing one of a loading operation and an unloading operation by the robotic carton handling system using the 3D location.

9. A carton detection system to facilitate unloading cartons in a carton pile by a robotic carton handling system:
   a sensor configured to provide a two-dimensional (2D) optical image and a three-dimensional (3D) point cloud of at least one portion of a carton pile resting on a floor of a transportation carrier;
   a processing subsystem in communication with the sensor, the processing subsystem:
      detects a set of segments within the 3D point cloud;
      detects another set of segments within the 3D point cloud;
      qualifies the set of segments as 3D detected cartons and the another set of segments as 2D detected cartons;
      combine the 2D and 3D detected cartons into a detection result; and
      convert the detection result using calibration information into a 3D location for cartons targeted for removal to enable the robotic carton handling system to remove the cartons from the carton pile.

10. The robotic carton handling system of claim 9, wherein the set of segments are qualified as the 3D detected cartons if the processing subsystem determines that the set of segments are lesser than a segment threshold.

11. The robotic carton handling system of claim 9, wherein the another set of segments are qualified as the 2D detected cartons if the if the processing subsystem determines that the another set of segments are greater than a segment threshold.

12. The robotic carton handling system of claim 11, wherein in response to determining that the another set of segments are greater than the segment threshold, the processing subsystem:
   determines a 2D mask that corresponds to the another set of segments;
   determines a portion of the 2D image that corresponds to the 2D mask;
   detects the another set of segments within the portion of the 2D image; and
   qualifies detected another set of segments as the 2D detected cartons.

13. The robotic carton handling system of claim 9, wherein:
   the sensor is positioned on the robotic carton handling system to detect the one portion of the carton pile;

the robotic carton handling system further comprises another sensors positioned on the robotic carton handling system to detect a contiguous portion of the carton pile; and
the processing subsystem combines the 2D and 3D detected cartons from both the one portion and the contiguous portion to form the detection result.

14. The robotic carton handling system of claim 9, wherein the processing subsystem qualifies the one or more segments as the 2D detected cartons at least in part by discarding edges that form a smaller rectangle fully encompassed within a larger rectangle.

15. The robotic carton handling system of claim 9, wherein the processing subsystem is further configured to stitch the 2D image and the 3D point cloud together to obtain an image of the carton pile.

16. The robotic carton handling system of claim 9, further comprising an automation controller in communication with the processing subsystem, the automation controller causes a robotic carton manipulator to perform one of the loading operation and the unloading operation by the robotic carton handling system using the 3D location.

17. A material handling system comprising:
a robotic carton handling system for unloading cartons in a carton pile, the robotic carton handling system movable across a floor, the robotic carton handling system comprising:
a mobile body;
a movable robotic manipulator attached to the mobile body and comprising an end effector at an end thereof, the end effector configured to unload one or more cartons from the carton pile;
a conveyor mounted on the mobile body configured to receive the one or more cartons from the end effector and to move the one or more cartons towards a rear of the robotic carton handling system;
a carton detection system comprising:
one or more sensors coupled respectively to one of the mobile body and the movable robotic manipulator to provide a two-dimensional (2D) optical image and a three-dimensional (3D) point cloud of at least one portion of carton pile resting on a floor of a transportation carrier;
a processing subsystem in communication with the one or more sensors, the processing subsystem:
detects a set of segments within the 3D point cloud;
detects another set of segments within the 3D point cloud;
qualifies the set of segments as 3D detected cartons and the another set of segments as 2D detected cartons;
combine the 2D and 3D detected canons into a detection result; and
convert the detection result using calibration information into a 3D location for cartons targeted for removal,
an automation controller in communication with the processing subsystem, the automation controller causes a robotic carton manipulator to perform the selected one of the loading operation and the unloading operation by the robotic carton handling system using the 3D location; and
an extendable conveyor system having a proximal end coupled to a stationary conveyor system and a movable distal end positioned proximate to the robotic carton handling system to transfer cartons between the stationary conveyor and the robotic carton handling system.

18. The material handling system of claim 17, wherein the processing subsystem is further configured to:
receive the 2D image and 3D point cloud from one or more sensors positioned on the robotic carton handling system to detect the one portion of the carton pile;
receive a 2D image and 3D point cloud from another one or more sensors positioned on the robotic carton handling system to detect a contiguous portion of the carton pile; and
combine the 2D and 3D detected cartons from both the one portion and the contiguous portion to form the detection result.

19. The material handling system of claim 17, where in the processing subsystem is further configured to:
determine a 2D mask that corresponds to the another set of segments;
determine a portion of the 2D image that corresponds to the 2D mask;
detect the another set of segments within the portion of the 2D image; and
quality detected another set of segments as the 2D detected cartons.

* * * * *